United States Patent
Petersen, Jr. et al.

(10) Patent No.: US 12,142,992 B2
(45) Date of Patent: Nov. 12, 2024

(54) NOISE ABATEMENT FOR ELECTRIC MOTORS

(71) Applicants: James E. Petersen, Jr., Houston, TX (US); Michael David Roush, The Woodlands, TX (US); Keith Louis Verspoor, Seabrook, TX (US); Jose Armando Godinez Rodriguez, Houston, TX (US)

(72) Inventors: James E. Petersen, Jr., Houston, TX (US); Michael David Roush, The Woodlands, TX (US); Keith Louis Verspoor, Seabrook, TX (US); Jose Armando Godinez Rodriguez, Houston, TX (US)

(73) Assignee: Gulf Electroquip, LTD., Houston, TX (US)

(*) Notice: Subject to any disclaimer, the term of this patent is extended or adjusted under 35 U.S.C. 154(b) by 171 days.

(21) Appl. No.: 16/950,419

(22) Filed: Nov. 17, 2020

(65) Prior Publication Data

US 2021/0159757 A1    May 27, 2021

Related U.S. Application Data

(60) Provisional application No. 62/941,132, filed on Nov. 27, 2019.

(51) Int. Cl.
| | |
|---|---|
| *H02K 17/16* | (2006.01) |
| *H02K 1/2706* | (2022.01) |
| *H02K 1/32* | (2006.01) |
| *H02K 5/24* | (2006.01) |

(52) U.S. Cl.
CPC ............. *H02K 5/24* (2013.01); *H02K 1/2706* (2013.01); *H02K 1/32* (2013.01)

(58) Field of Classification Search
CPC .......... H02K 5/24; H02K 1/2706; H02K 1/32; H02K 3/24; H02K 17/16; H02K 17/165; H02K 17/18; H02K 17/185
USPC .......... 310/51, 156.78–156.84, 211, 212, 270
See application file for complete search history.

(56) References Cited

U.S. PATENT DOCUMENTS

| | | |
|---|---|---|
| 1,037,659 A | 9/1912 | Rembert |
| 1,274,058 A | 7/1918 | Kutsche |
| 1,785,918 A | 12/1930 | Stebbins |
| 1,815,529 A | 7/1931 | Shurtleff |
| 2,209,607 A | 7/1940 | Nutting |
| 2,289,474 A | 7/1942 | Anderson |
| 2,293,590 A | 8/1942 | Chance |
| 2,593,294 A | 4/1952 | Goldberg |
| 2,780,308 A | 2/1957 | Mullin et al. |
| 3,796,511 A | 3/1974 | Hansen |
| 3,827,482 A | 8/1974 | Pope |
| 3,942,500 A | 3/1976 | Koehm et al. |

(Continued)

FOREIGN PATENT DOCUMENTS

| | | |
|---|---|---|
| GB | 687031 A | 2/1953 |
| JP | 62276297 A | 12/1987 |
| SU | 348214 A1 | 9/1972 |

*Primary Examiner* — Michael Andrews
(74) *Attorney, Agent, or Firm* — Michael S. McCoy; Amatong McCoy LLC

(57) ABSTRACT

An electric motor is provided. The motor includes a stator and a rotor positioned concentrically within the stator. Between the ends of the rotor, the rotor lacks radial air flow paths that extend into the annular space between the rotor and the stator.

12 Claims, 5 Drawing Sheets

(56) References Cited

U.S. PATENT DOCUMENTS

| | | | |
|---|---|---|---|
| 3,965,380 A * | 6/1976 | Stepina | H02K 7/125 |
| | | | 310/212 |
| 4,361,490 A | 11/1982 | Saget | |
| 4,382,804 A | 5/1983 | Mellor | |
| 4,468,234 A | 8/1984 | McNicholas | |
| 4,832,709 A | 5/1989 | Nagyszalanczy | |
| 4,877,424 A | 10/1989 | Perkola et al. | |
| 5,000,769 A | 3/1991 | Raguideau et al. | |
| 5,766,315 A | 6/1998 | Moredock | |
| 5,925,960 A * | 7/1999 | Hayes | H02K 17/165 |
| | | | 29/889.3 |
| 6,293,751 B1 | 9/2001 | Stockstill | |
| 6,648,935 B2 | 11/2003 | Petersen, Jr. | |
| 2010/0156207 A1* | 6/2010 | Pellegrino | H02K 17/16 |
| | | | 310/59 |
| 2016/0372985 A1* | 12/2016 | Sailor | H02K 7/04 |

* cited by examiner

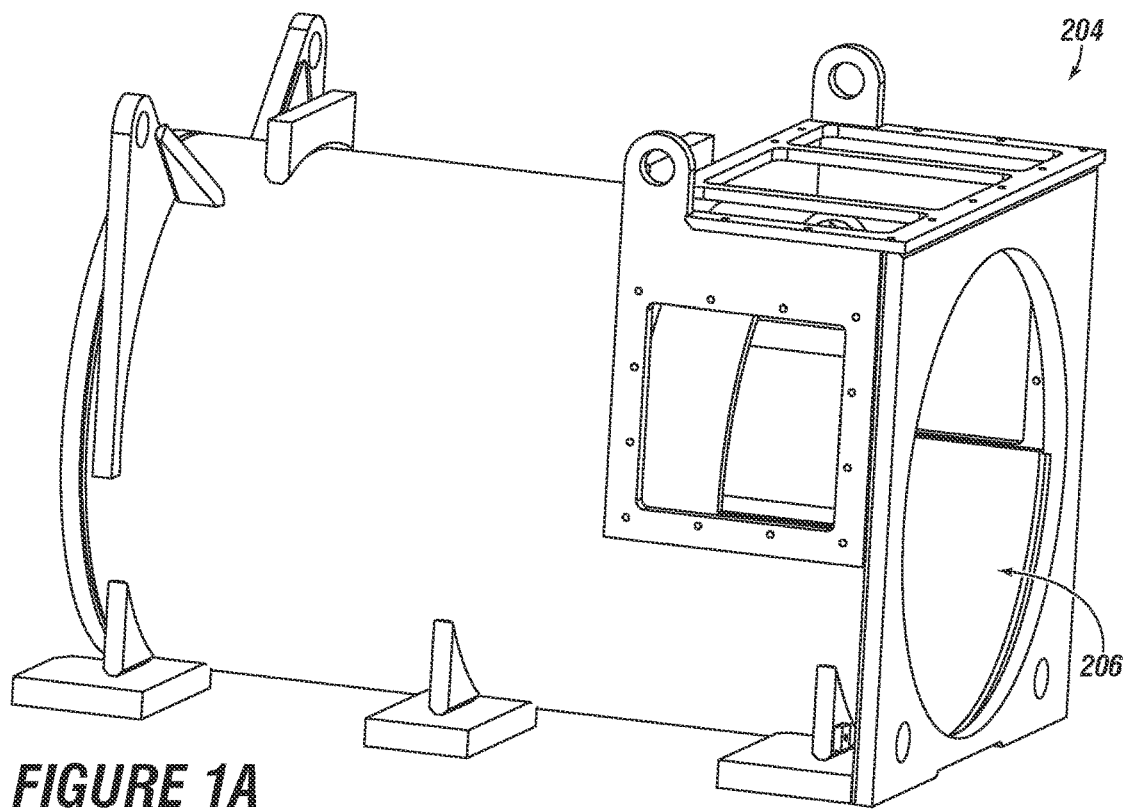
FIGURE 1A
FIGURE 1B
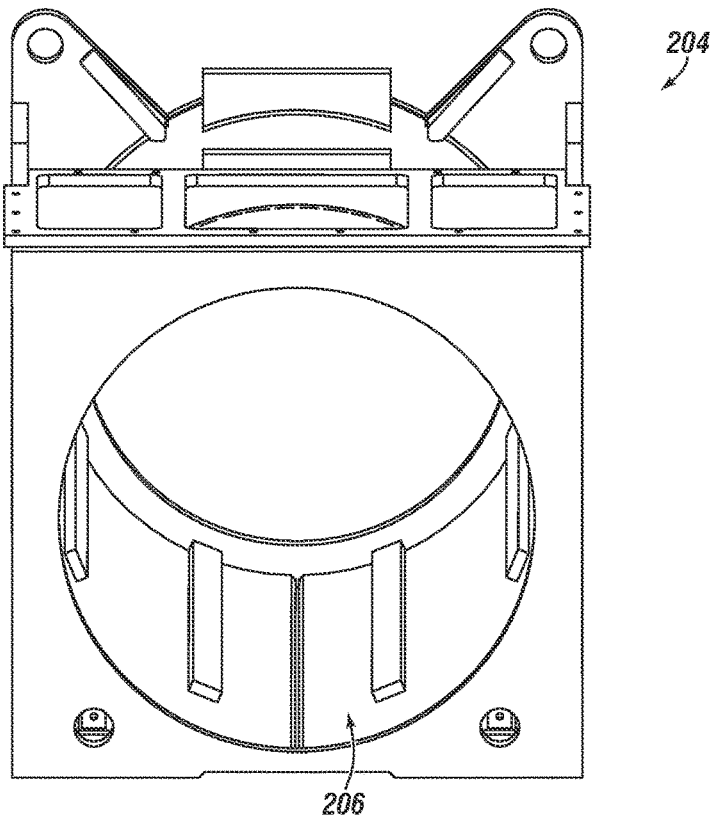

*FIGURE 1C*
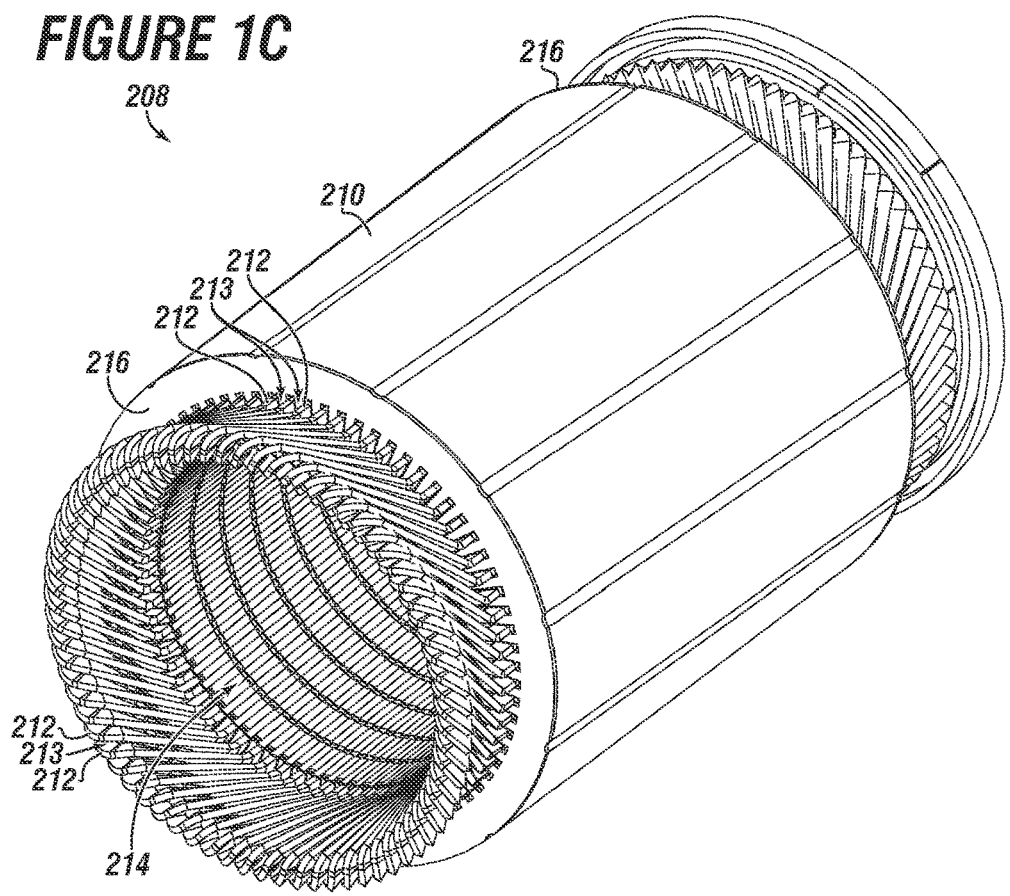
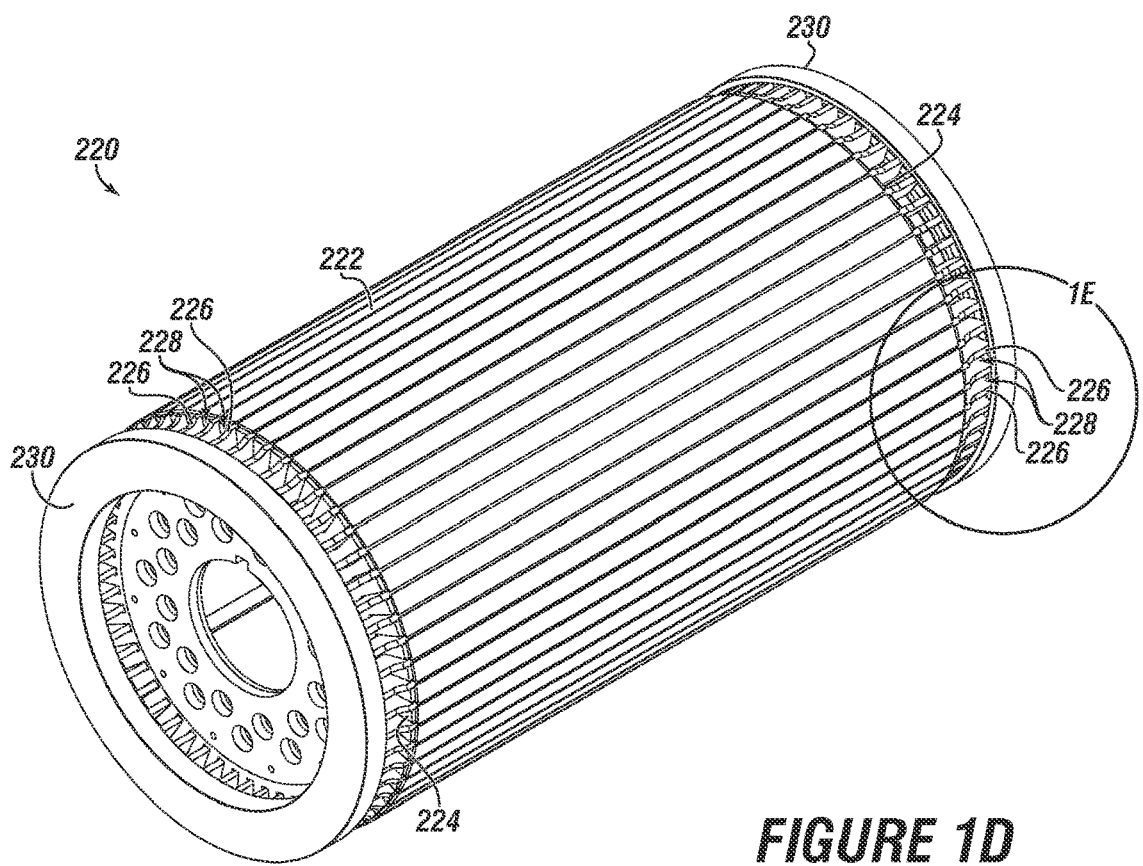
*FIGURE 1D*

NOISE ABATEMENT FOR ELECTRIC MOTORS

CROSS-REFERENCE TO RELATED APPLICATIONS

The present application claims the benefit of United States Provisional Patent Application No. 62/941,132, entitled "NOISE ABATEMENT FOR ELECTRIC MOTORS", filed on Nov. 27, 2019, the entirety of which is incorporated herein by reference.

FIELD

The present disclosure relates to apparatus and systems for noise abatement for electric motors and to methods of making and using the same.

BACKGROUND

Electric motors include a rotor positioned within a stator. The rotor rotates within and relative to the stator. Rotors typically have bars which form fins that extend outwards from the ends of the rotors. These bars, each evenly spaced from adjacent bars, rotate along with the rotor, such that the bars, as fins, act similar to fan blades by forcing air flow. With the stator positioned concentrically about the rotor, the air flow produced in this manner can also produce a noise that is the same or similar to an air-raid siren. Sounds emitted by equipment, such as electric motors, contribute to objectionable noise. It would be desirable to abate the noise of electric motors.

BRIEF SUMMARY

Some embodiments of the present disclosure include an electric motor. The electric motor includes a stator which contains a cavity. The electric motor includes a rotor which includes a rotor core having a first end and a second end. A first end ring is immediately adjacent to the first end of the rotor core, and a second end ring is immediately adjacent to the second end of the rotor core. The rotor is positioned concentrically within the cavity of the stator such that an annular space is formed between the outer diameter surface of the rotor and the inner diameter surface of the stator within the cavity. Outboard of the ends of the rotor core, the rotor lacks radial air flow paths that extend into the annular space.

Some embodiments of the present disclosure include a method of abating noise emitted from an electric motor that produces objectionable noise. The electric motor includes a stator having a cavity, and a rotor including a rotor core having a first end and a second end. The rotor also has evenly spaced rotor bars extending from the first and second ends of the rotor core. The first end ring is attached to the rotor bars extending from the first end of the rotor core, and the second end ring is attached to the rotor bars extending from the second end of the rotor core. The rotor is positioned concentrically within the cavity of the stator such that an annular space is formed between the outer diameter surface of the rotor and the inner diameter surface of the stator within the cavity. The method includes blocking radial air flow paths, between the first end ring and the second end ring, that extend into the annular space from the rotor.

BRIEF DESCRIPTION OF THE DRAWINGS

So that the manner in which the features and advantages of the systems, apparatus, and methods may be understood in more detail, a more particular description may be had by reference to the embodiments which are illustrated in the appended drawings that form a part of this specification. It is to be noted, however, that the drawings illustrate only various exemplary embodiments and are therefore not to be considered limiting of the disclosed concepts as it may include other effective embodiments as well.

FIGS. 1A and 1B depict a motor housing.

FIG. 1C depicts a stator.

FIG. 1D depicts a rotor with radial pathways for air flow at each end of the rotor.

Figure 1E:
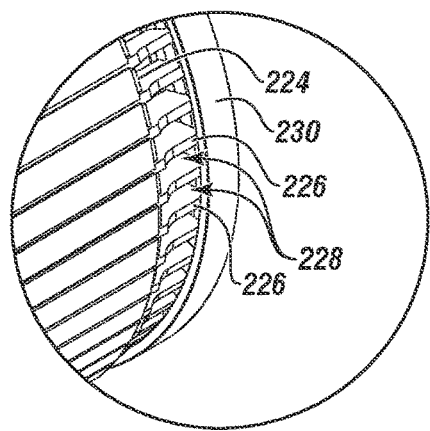
FIG. 1E is a detail view of one end of the rotor of FIG. 1D.

Systems, apparatus, and methods according to present disclosure will now be described more fully with reference to the accompanying drawings, which illustrate various exemplary embodiments. Concepts according to the present disclosure may, however, be embodied in many different forms and should not be construed as being limited by the illustrated embodiments set forth herein. Rather, these embodiments are provided so that this disclosure will be thorough as well as complete and will fully convey the scope of the various concepts to those skilled in the art and the best and preferred modes of practice.

DETAILED DESCRIPTION

Certain aspects of the present disclosure include apparatus, systems, and methods for noise abatement in equipment, such as motors. As used herein, "noise abatement" refers to the elimination or reduction of noise. For example, a piece of equipment may emit noise at a first intensity (decibels) during operation of the piece of equipment without the noise abatement features disclosed herein incorporated into the piece of equipment. After incorporation of the noise abatement features disclosed herein into the piece of equipment, the piece of equipment may emit noise at a second intensity (decibels) during operation of the piece of equipment, wherein the second intensity is less than the first intensity. In some embodiments, the apparatus, systems, and/or methods for noise abatement disclosed herein function to dampen the noise produced by the equipment. During propagation of sound, sound waves can be reflected, refracted, and/or attenuated by the noise abatement features disclosed herein. The apparatus, systems, and/or methods for noise abatement disclosed herein may be incorporated into equipment including, but not limited to, electric motors.

Electric Motors

Some embodiments of the present disclosure include apparatus, systems, and methods for noise abatement in electric motors. With reference to FIGS. 1A and 1B, the electric motors disclosed herein may include a housing 204. Housing 204 includes a cavity 206. The cavity 206 is sized, shaped and arranged to receive a stator of the motor.

With reference to FIG. 1C, stator 208 is shown, which may be positioned within cavity 206 of housing 204. Stator 208 includes stator core 210, which is a solid body including (optionally consisting of) laminations. Winding 212 is wound onto stator core 210. Stator 208 includes or defines cavity 214. As shown in FIG. 1C, windings 212 (electromagnetic coils) extend outward from the solid stator core 210 past each stator core end 216. The portion of windings 212 that extend outwards from stator core ends 216 include void spaces 213 between adjacent portions of windings 212, such that air can flow between the windings 212 to cool the windings 212.

FIG. 1D depicts a rotor 220. Rotor 220 includes body or rotor core 222, which may be a solid body, including a laminated core. The solid portion of rotor core 222 ends at rotor ends 224. From rotor ends 224, rotor bars 226 (also referred to as rotor fins) extend out from rotor core 222, with void spaces 228 between each pair of adjacent bars 226, as is more evident in FIG. 1E. In operation, the void spaces 228 allow for the passage of air between bars 226 to provide for the cooling of rotor 220. Bars 226 are coupled with (e.g., attached to) end rings 230, which may be solid body rings (e.g., copper rings).

Siren Effect

Without being bound by theory, when rotor 220 is positioned concentrically within cavity 214 of stator 208 and is rotating therein, portions of the rotor bars 226 are positioned radially inside of the portion of windings (i.e. stator end turns) 212 that extend beyond stator ends 216. As the rotor 220 rotates, the portions of the rotor bars 226 function as fan blades, pushing air. With the close proximity of rotor 220 and stator 208, this movement of air within motor 200 (shown in FIGS. 3A and 3B) results in an air-raid siren effect. That is, the forced pulses of air by the bars 226 causes the sound of an air-raid siren to emanate from the motor 200. The air path intersection between the rotor 220 and stator 208, where air flows centrifugally between the rotor bars 226 towards the stator windings 212 while the rotor 220 is spinning, causes the siren effect. If the motor 200 is coupled with an air blower, then the objectionable noise may emanate from the air blower in addition to or instead of the air-raid siren sound of the motor 200. During rotation of the rotor 220, this airflow from the rotor 220 towards the stator windings 212 is alternatingly allowed to pass towards the stator windings 212 between the bars 226 (i.e., through void spaces 228) and alternatingly prevented from passing towards the stator windings 212 by the bars 226 as the rotor bars 226 rotate beneath the stator windings 212 (also referred to as stator coils). The continual alternation of allowing the air to flow through void spaces 228 and preventing the air from flowing through voids spaces 228 causes the local air pressure to alternate between a relatively compressed (high pressure) state and a relatively rarefied (low pressure) state. Such alternating pressure (pulsations) forms sound waves and attendant noise. Without being bound by theory, the frequency of the siren emitted from the motor 200 is determined by the rate at which the rotor bars 226 pass a location on the stator windings 212. The sound pressure level can be measured in decibels (dB) and determined by the ratio of the fluctuating local air pressure to that of a reference pressure. The frequency of the siren can be determined in accordance with the following equation (Equation 1): frequency of siren (Hz)=(number of rotor bars)×N. In Equation 1, N=rotational speed (revolutions per second) of the rotor. The sound pressure level of the siren can be determined in accordance with the following equation (Equation 2): sound pressure level (dB)=$20 \times \log_{10}$ (Pressure/Pressure-ref). In Equation 2, "Pressure-ref"=$20 \times 10^{-6}$ pascals. Thus, the sound pressure level and the frequency of the rotation of the rotor, combined, define the siren effect. At some speeds of the rotor 220, the frequency and strength of the pulsations formed by the interaction of the rotor 220, stator 208, and air-flow therebetween results in a loud siren effect. In some embodiments, such a loud siren effect can be unpleasant to hear and can be reminiscent of an objectionable howling noise.

Without being bound by theory, it is believed that retarding or blocking the pathway of air between the bars 226 will reduce or eliminate the emanation of an air-raid siren sound from the motor 200. By blocking the pathway of air between the bars 226, the bars 226 will not function as fan blades, such that the bars 226 will no longer push air into and through the annular space between the (rotor bar) void spaces 228 and the (stator winding) void spaces 213. As such, some embodiments provide for a rotor that lacks radial air flow paths between the rotor bars such that they would act as fins or fan blades. Retarding or blocking the airflow between the rotor bars diminishes or eliminates the airflow affected by the alternating interruptions of air flow and resulting pressure pulsations as the rotor bars pass under the stator coils. In some embodiments, retarding or blocking the pathway of air is accomplished by installing an air flow pathway restrictor in the motor. In some embodiments, retarding or blocking the pathway of air is accomplished by inserting a ring (e.g., a relatively thin non-magnetic, metallic ring) on the outer diameter (OD) and/or inner diameter (ID) of the rotor cage (i.e. rotor bars); by fabricating the rotor cage end rings so that the end rings are close to or adjacent to the laminated core of the rotor; or inserting a material into the void spaces between the rotor bars to block the air flow therethrough. In one particular embodiment, a ring is positioned in the axial space between the rotor core and the rotor end ring, immediately on the inside radius of the rotor bars; thereby, eliminating the path for air pulsations to develop. In some embodiments, the elimination of the siren effect by blocking the air flow pathways is performed without impairing cooling of the motor to the degree that the motor can yet meet the power and temperature rating requirements of the motor. In some embodiments, other design parameter modifications to the motor are performed to compensate for the loss of cooling that is attendant with the blocking the air flow pathways.

Air Flow Modulation

Figure 2A:
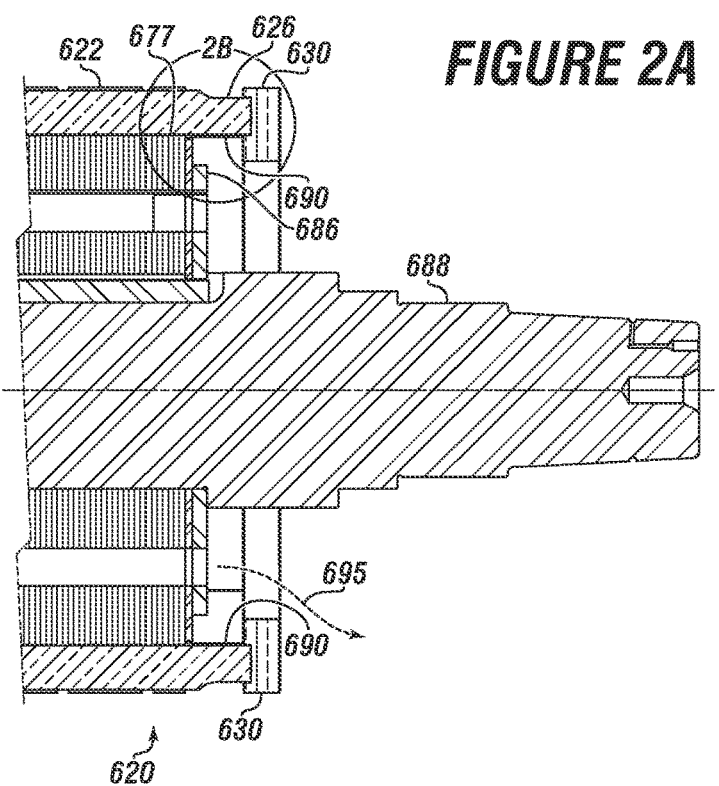
FIG. 2A depicts a portion of a rotor in accordance with some embodiments of the present disclosure, including a noise abatement component (an airflow pathway restrictor) incorporated into the rotor.
Figure 2B:
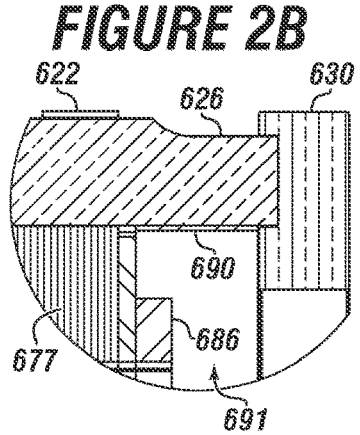
FIG. 2B is a detail view of a portion of the rotor of FIG. 2A.
Figure 2C:
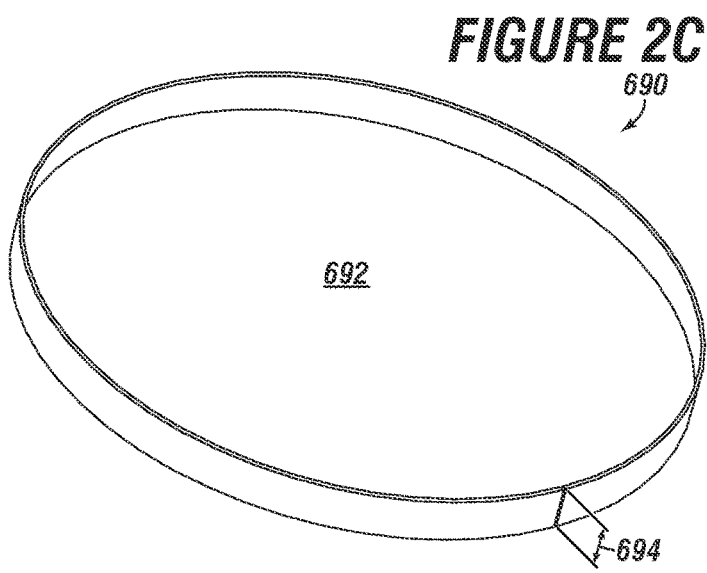
FIG. 2C depicts a noise abatement component (airflow pathway restrictor) including a ring in accordance with some embodiments of the present disclosure.

With reference to FIGS. 2A-2C, a rotor modified for noise abatement in accordance with the present disclosure is described. Rotor 620, including rotor shaft 688, is substantially similar to rotor 220 of FIG. 1D, but with an underbar ring 690 positioned and secured underneath the rotor bars 626 and positioned to block the openings between the rotor bars 626 and between the end rings 630 and the solid rotor core 622. Ring 690 may be welded to, integral with, or otherwise attached to the rotor 620. In one exemplary embodiment, ring 690 is a 14-gauge thick sheet made of a non-magnetic material, such as austenitic stainless-steel material. In one exemplary construction, ring 690 is positioned on the rotor 620 after the rotor bars 626 and end rings 630 have been brazed. The position of ring 690 may be secured by tack welds, for example. While shown as positioned underneath the rotor bars 626, a ring that is the same or similar to ring 690 may be positioned above the rotor bars 626 on an outside surface of rotor 620. Also, while ring 690 is shown as being used to block the radial air flow paths (void spaces 228) between the rotor bars 226, the present disclosure is not limited to use of such a ring, and may employ other methods or apparatus for blocking the radial air flow paths between the rotor bars and into the stator windings. For example, rather than a single ring blocking all void spaces between the rotor bars 626, discrete portions of material may be positioned within each of the void spaces between the rotor bars 626 to block the flow paths therethrough. For example, discrete portions of metal (e.g., stainless steel) can be welded within each of the void spaces between the rotor bars 626. In another embodiment, the rotor lacks exposed rotor bars that extend past the rotor core, such that there is no or substantially no space between the end rings of the rotor and the rotor core and that there are, thus, no void spaces between rotor bars.

Without blocking (or otherwise eliminating or restricting) the radial air flow paths between the rotor bars and the stator, objectionable noise emanates from the motor, the frequency of which is the product of the number of bars and the rotating speed of the motor (i.e., the rotating speed of the rotor within the stator). As air passes radially-outward between the rotor bars and as each rotor bar passes near a stationary object (i.e., the stator winding 212 within which the rotor is positioned concentrically), a pulsation of air pressure results. As the speed of rotor approaches rated speed (e.g., 800 RPM in some embodiments), the frequency and strength of the pulsations can develop into an unpleasantly loud tonal noise. In order to reduce the overall sound level and discrete tonal noise, the air pulsations can be reduced or eliminated. By preventing the radial air flow between the rotor bars, the source of the pulsations can be effectively removed. The underbar ring 690 fills the axial space between the rotor core 622, which includes lamination stack 677, and the rotor end rings 630, thus, eliminating the pathways in which the air pulsations develop. In some embodiments, an entirety of the cooling air provided to the motor disclosed herein is provided through windings of the stator and into the annular space between the stator and the rotor. By eliminating the radial air flow paths, cooling air is directed into the rotor core and distributed through the stator to more effectively carry away the inherent losses from the motor 200. Thus, the motors disclosed herein can emanate less noise, while delivering the required power for the application without violating temperature limits.

The present disclosure is not limited to use of rings for preventing the passage of air between rotor core area 691 and annular space outside of the rotor (i.e., between the rotor bars 226 and the stator winding 212), and may use other methods or structures to prevent such passage of air. In some embodiments, air that is prevented from passing between the rotor bars 626 is directed or re-routed to flow about the outside of end rings 630, as indicated by flow path 695. In some embodiments, the end rings 630 extend to the press plate 686 and/or rotor laminations 677 of rotor 620 (i.e., are immediately adjacent thereto without an axial space therebetween), such that the rotor 620 does not have rotor bars that extend outward from rotor core 622, and such that there is no air path between the end rings 630 and the rotor core 622 that lead into space between the rotor and stator. Thus, the air is re-routed to the outside of the rotor end rings 630.

Ring 690 is shown in isolation from rotor 620 in FIG. 2C. Ring 690 defines opening 692. Ring 690 has width 694. Width 694 may be sufficient to block all or substantially all air flow paths between the rotor bars of the rotor to which it is attached. Ring 690 can have a circumference that is sufficient to circumferentially surround the rotor bars of the rotor to which it is attached, along an internal or an external diameter thereof.

In some embodiments, an existing rotor that lacks the air-flow modulation features disclosed herein is retrofitted to have the air-flow modulation features disclosed herein. For example, the ring 690 may be welded to an existing rotor that lacks the air-flow modulation features disclosed herein. Thus, some embodiments of the present disclosure provide for methods of retrofitting an existing rotor to have air-flow modulation features. The air-flow modulation features disclosed herein can seal off any flow paths between the end rings 630 and core 622 that extend from space 691 into the annular space between the rotor 622 and stator 208.

Figure 2D:
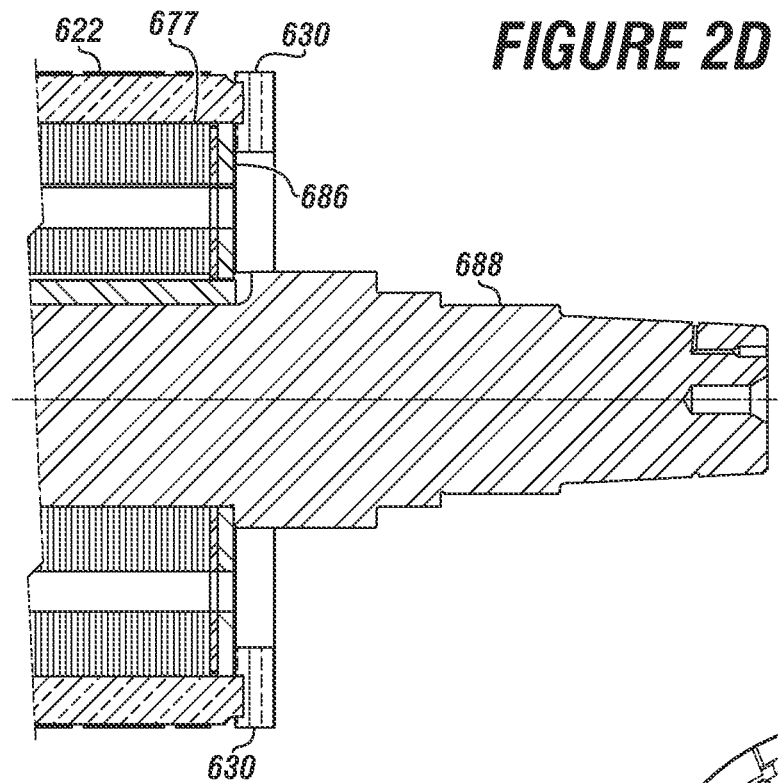
FIG. 2D depicts a noise abatement component (airflow pathway restrictor) including the absence of a gap between the end ring of the rotor and the core of the rotor in accordance with some embodiments of the present disclosure.

FIG. 2D depicts an alternative embodiment of a noise abatement component (airflow pathway restrictor). In FIG. 2D, rather than including a ring 690 to block the air flow paths 628 between bars 626, the rotor of FIG. 2D is constructed such that there is no airflow pathway formed between end rings 630 and laminations 677 or rotor core 622. That is, end rings 630 are immediately adjacent to press plate 686, such that rotor bars do not extend past rotor core 622.

Figure 2E:
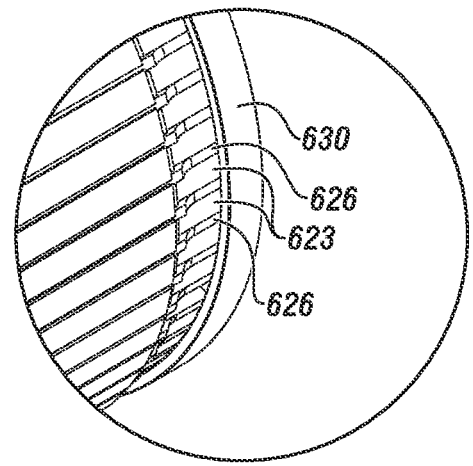
FIG. 2E depicts a noise abatement component (airflow pathway restrictor) including a material blocking the airflow pathways in accordance with some embodiments of the present disclosure.

FIG. 2E depicts another alternative embodiment of a noise abatement component (airflow pathway restrictor). In FIG. 2E, rather than including a ring 690 to block the air flow paths 628 between bars 626, the rotor of FIG. 2E includes material 623 positioned between bars 626 to block the airflow pathway that would otherwise be formed there. Material 623 can be, for example, metal.

Figure 3A:
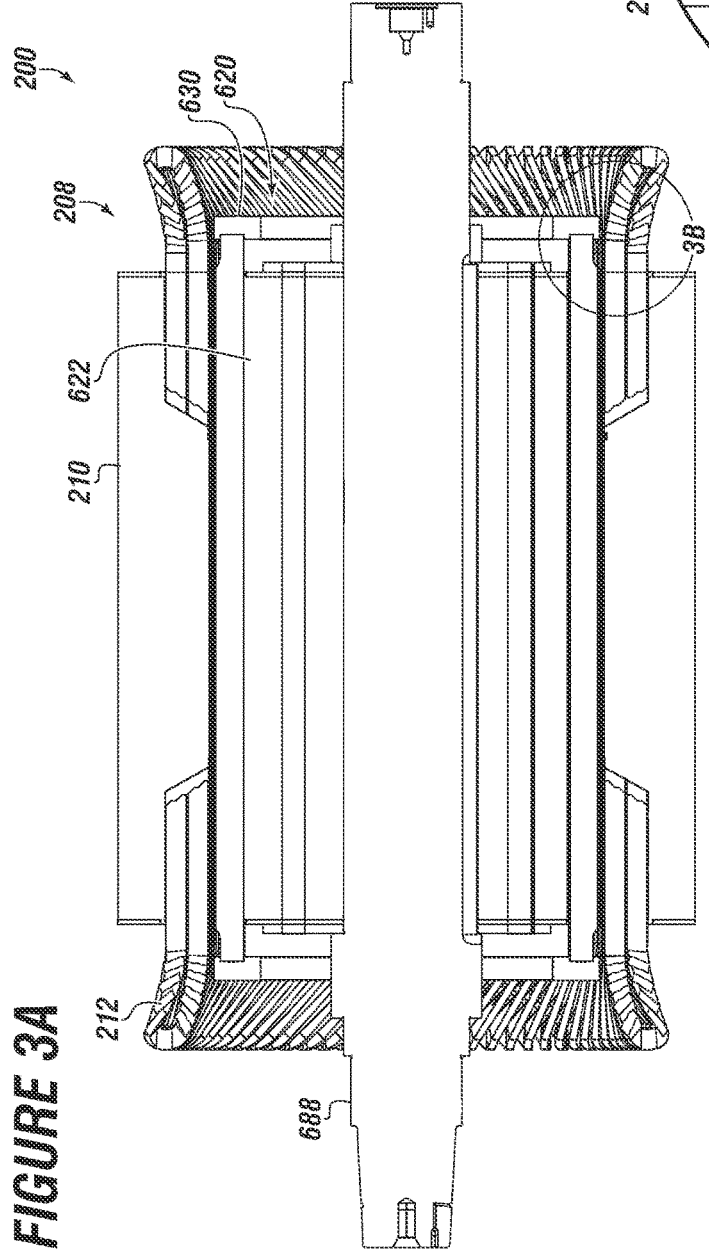
FIG. 3A is a cross-sectional view of a rotor positioned within a stator.
Figure 3B:
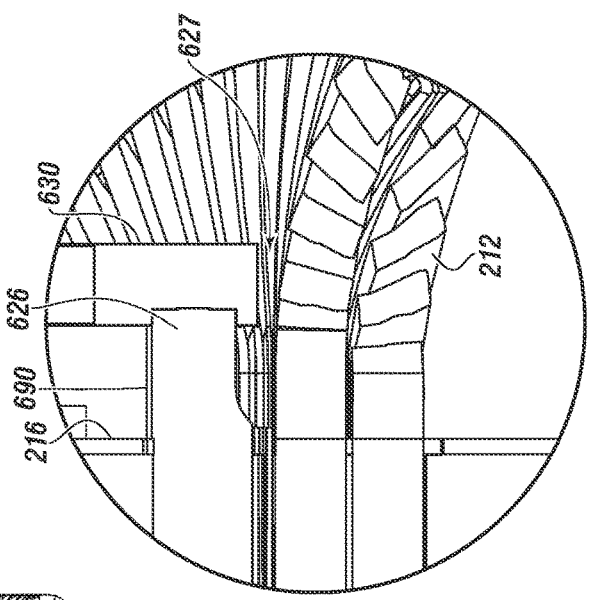
FIG. 3B is a detail view of a portion of FIG. 3A.

FIGS. 3A and 3B depict rotor 620 positioned concentrically within stator 208. Ring 690 is positioned and secured to the rotor bars 626 on an internal diameter of rotor bars 626, blocking air flow paths therethrough. Rotor 620 and stator 208 are at least partially cooled via air flow through annular space 627 between the (rotor bar) void spaces 228 and the (stator winding) void spaces 213. In operation, rotor 620 rotates within stator 208, driving shaft 688. Shaft 688 can be coupled with a piece of equipment, such that rotation of shaft 688 drives the operation of the piece of equipment.

Applications

The electric motors disclosed herein may be induction motors used to drive a drawworks, a pump (e.g., a mud pump), a top drive, a drilling motor, or another piece of oil and gas drill site equipment. While described for use with oil and gas drill site equipment, the motors disclosed herein may be used in other applications. In some embodiments, the electric motors disclosed herein may be coupled an air blower for cooling of electric motors to maintain the motor at acceptable operating temperatures, and may include a junction box therebetween. In such embodiments, cooling air may exit the air blower and enter the motor. The cooling air may flow through the motor, such as within annular space 627, to cool the coils (windings 212) of the motor, and may then exit the motor as exhaust. In other embodiments, the electric motor disclosed herein is used without an air blower.

Exemplary Embodiments

Some exemplary embodiments will now be described.

Embodiment 1. An electric motor, the motor comprising: a stator, the stator including a cavity; a rotor, the rotor including a rotor core having a first end and a second end, a first end ring immediately adjacent to the first end of the rotor core, and a second end ring immediately adjacent to the second end of the rotor core; wherein the rotor is positioned concentrically within the cavity of the stator such that an annular space is formed between the rotor and the stator within the cavity; and wherein, between the first end ring and the second end ring, the rotor lacks radial air flow paths that extend into the annular space.

Embodiment 2. The motor of embodiment 1, wherein the rotor comprises evenly spaced rotor bars extending from the first and second ends of the rotor core, wherein the first end ring is attached to the ends of the rotor bars extending from the first end of the rotor core, wherein the second end ring is attached to the ends of the rotor bars extending from the second end of the rotor core; and wherein, outboard of the ends of the core, the rotor exhibits radial air flow paths that extend between the evenly spaced rotor bars and into the annular space.

Embodiment 3. The motor of any of embodiments 1 or 2, further comprising an air flow restrictor on the rotor, wherein the air flow restrictor is positioned to block air flow between the evenly spaced rotor bars and into the annular space.

Embodiment 4. The motor of embodiment 3, wherein the air flow restrictor comprises a ring positioned and secured to the rotor bars.

Embodiment 5. The motor of embodiment 4, wherein the ring is positioned on an internal surface of the rotor bars.

Embodiment 6. The motor of embodiment 4, wherein the ring is positioned on an external surface of the rotor bars.

Embodiment 7. The motor of embodiment 1, wherein the first end ring is immediately adjacent to the rotor core, and wherein the second end ring is immediately adjacent to the rotor core. As used herein, the end rings being "immediately adjacent" to the rotor core refers to end ring being abutted to the rotor core without any intermediate structures therebetween (e.g., without exposed rotor bars extending between the end ring and the rotor core), such that there is no void space between the rotor core and the end rings.

Embodiment 8. The motor of embodiment 3, wherein the air flow restrictor comprises material positioned within or adjacent the spaces between the evenly spaced rotor bars.

Embodiment 9. A method of abating noise emitted from an electric motor, the method comprising: providing an electric motor, the electric motor comprising a stator having a cavity; and a rotor including a rotor core having a first end and a second end, a first end ring immediately adjacent to the first end of the rotor core, and a second end ring immediately adjacent to the second end of the rotor core, wherein the rotor is positioned concentrically within the cavity of the stator such that an annular space is formed between the rotor and the stator within the cavity; and blocking air flow paths, between the first end ring and the second end ring, that extend into the annular space from the rotor.

Embodiment 10. The method of embodiment 9, wherein the rotor core includes rotor bars extending from the first end to the first end ring and from the second end to the second end ring, and wherein blocking the air flow paths includes blocking air flow paths that extend between the rotor bars.

Embodiment 11. The method of embodiment 10, wherein blocking the air flow paths that extend between the rotor bars includes positioning and securing a ring with the rotor bars, wherein the ring is positioned to block air flow paths that extend between the rotor bars.

Embodiment 12. The method of embodiment 10, wherein blocking the air flow paths that extend between the rotor bars includes positioning a material within or adjacent the spaces between the evenly spaced rotor bars.

Embodiment 13. The method of embodiment 9, wherein blocking the air flow paths comprises abutting the first end ring immediately adjacent to the rotor core and abutting the second end ring immediately adjacent to the rotor core.

Embodiment 14. The method of embodiment 9, wherein blocking the air flow paths reduces or eliminates the occurrence of air pulsations between the rotor and the stator.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An electric motor, the motor comprising:
a stator, the stator including a cavity;
a rotor, the rotor including a rotor core having a first end and a second end, rotor bars extending from the first and second ends of the rotor core, a first end ring coupled with the rotor bars extending from the first end of the rotor core, and a second end ring coupled with the rotor bars extending from the second end of the rotor core;
wherein the rotor is positioned within the cavity of the stator such that an annular space is formed between the outer diameter surface of the rotor and the inner diameter surface of the stator within the cavity, and wherein void spaces are positioned between adjacent rotor bars that extend from the first and second ends of the rotor core, wherein the void spaces define air flow paths into the annular space; and
air flow restrictors attached to the rotor bars that extend from the first and second ends of the rotor core, wherein the air flow restrictors comprise material positioned within a plurality of the void spaces between adjacent rotor bars and attached to the rotor bars to block the air flow paths between the rotor bars that extend into the annular space such that the air flow restrictors eliminate all of the air flow paths between the rotor bars and abate sound emitted by the electric motor.

2. The motor of claim 1, wherein the material of the air flow restrictors is welded directly to the rotor bars within each of the void spaces between the rotor bars.

3. The motor of claim 1, wherein the material of the air flow restrictors is integral with the rotor bars.

4. The motor of claim 1, wherein the material of the air flow restrictors is positioned within each void space between each pair of adjacent rotor bars to seal all air flow paths between the rotor bars that extend into the annular space.

5. The motor of claim 1, wherein the air flow restrictors comprise discrete portions of the material positioned within each of the void spaces between the rotor bars that extend from the first and second ends of the rotor core, and wherein the material is attached to the rotor bars.

6. The motor of claim 1, wherein the material is positioned within each of the plurality of the void spaces between adjacent rotor bars and is attached to the adjacent rotor bars to block all of the air flow paths between the rotor bars that extend into the annular space such that the air flow restrictors eliminates all of the air flow paths between the rotor bars and abate sound emitted by the electric motor.

7. An electric motor, the motor comprising:
a stator, the stator including a cavity;
a rotor, the rotor including a rotor core having a first end and a second end, rotor bars extending from the first and second ends of the rotor core, a first end ring coupled with the rotor bars extending from the first end of the rotor core, and a second end ring coupled with the rotor bars extending from the second end of the rotor core;
wherein the rotor is positioned within the cavity of the stator such that an annular space is formed between the outer diameter surface of the rotor and the inner diameter surface of the stator within the cavity; and
air flow restrictors positioned between the first end ring and the second end ring, wherein the air flow restrictors eliminate all air flow paths that extend between the rotor bars into the annular space and abate sound emitted by the electric motor, and wherein the air flow restrictors comprise a plurality of discrete portions of material positioned in each void space between adjacent rotor bars and attached directly to the adjacent rotor bars to block the air flow paths between the adjacent rotor bars.

8. The motor of claim 7, wherein the air flow restrictors comprise rings attached directly to the rotor bars at the first and second ends.

9. The motor of claim 8, wherein the rings are positioned on and attached directly to an internal surface of the rotor bars.

10. The motor of claim 8, wherein the rings are positioned on and attached directly to an external surface of the rotor bars.

11. The motor of claim 7, wherein the air flow restrictors comprise rings attached directly to an internal or external surface of the rotor bars.

12. An electric motor, the motor comprising:
a stator, the stator including a cavity;
a rotor, the rotor including a rotor core having a first end and a second end, rotor bars extending from the first and second ends of the rotor core, a first end ring coupled with the rotor bars extending from the first end of the rotor core, and a second end ring coupled with the rotor bars extending from the second end of the rotor core;
wherein the rotor is positioned within the cavity of the stator such that an annular space is formed between the outer diameter surface of the rotor and the inner diameter surface of the stator within the cavity, and wherein void spaces are positioned between adjacent rotor bars that extend from the first and second ends of the rotor core, wherein the void spaces define air flow paths into the annular space; and
air flow restrictors attached to the rotor bars that extend from the first and second ends of the rotor core, wherein the air flow restrictors comprise a material positioned within a plurality of the void spaces between adjacent rotor bars and attached directly to the adjacent rotor bars to fill the void spaces, block the air flow paths between the adjacent rotor bars, and abate sound emitted by the electric motor.

* * * * *